US012140049B2

(12) United States Patent
Cox

(10) Patent No.: US 12,140,049 B2
(45) **Date of Patent: *Nov. 12, 2024**

(54) TURBINE NOZZLE ASSEMBLY

(71) Applicant: GE Infrastructure Technology LLC, Greenville, SC (US)

(72) Inventor: Christopher Paul Cox, Greenville, SC (US)

(73) Assignee: GE INFRASTRUCTURE TECHNOLOGY LLC, Greenville, SC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/067,823

(22) Filed: Dec. 19, 2022

(65) Prior Publication Data

US 2023/0296027 A1 Sep. 21, 2023

Related U.S. Application Data

(63) Continuation of application No. 17/562,130, filed on Dec. 27, 2021, now Pat. No. 11,560,806.

(51) Int. Cl.
*F01D 9/04* (2006.01)
*F01D 25/24* (2006.01)

(52) U.S. Cl.
CPC ............. *F01D 9/047* (2013.01); *F01D 9/042* (2013.01); *F01D 25/246* (2013.01); *F05D 2230/64* (2013.01); *F05D 2240/128* (2013.01); *F05D 2240/14* (2013.01); *F05D 2240/80* (2013.01)

(58) Field of Classification Search
CPC ........ F01D 25/24; F01D 25/28; F01D 25/246; F01D 9/04; F01D 9/042; F01D 9/047; F05D 2240/128; F05D 2230/60; F05D 2230/70; F05D 2230/64
See application file for complete search history.

(56) References Cited

U.S. PATENT DOCUMENTS 5,362,072 A 11/1994 Dalton et al.
6,189,211 B1 2/2001 Suter et al.
7,290,983 B2 11/2007 Tiemann
7,798,768 B2 9/2010 Strain et al.
8,070,427 B2 12/2011 Snook et al.
8,684,683 B2 4/2014 Brunt et al.
9,528,392 B2 12/2016 Casavant et al.
9,784,116 B2 10/2017 Hafner et al.
2010/0242487 A1 9/2010 Davis, Jr. et al.
2016/0153299 A1 6/2016 Tuertscher et al.
(Continued)

*Primary Examiner* — David E Sosnowski
*Assistant Examiner* — Maxime M Adjagbe
(74) *Attorney, Agent, or Firm* — Armstrong Teasdale LLP

(57) ABSTRACT

A turbine nozzle assembly for use in a turbine engine is provided. The assembly includes an inner barrel and a turbine nozzle support ring. The inner barrel has a forward end and an aft end. The turbine nozzle support ring includes an annular body that defines a forward end, an opposite aft end, an inner surface, and an opposite outer portion. The forward end of the annular body is coupled to the aft end of the inner barrel. The annular body includes a first arcuate segment and a second arcuate segment removably coupled to the first arcuate segment. The first arcuate segment has a first arcuate length and the second arcuate segment has a second arcuate length. The second arcuate length is shorter than the first arcuate length.

19 Claims, 10 Drawing Sheets

(56) References Cited

U.S. PATENT DOCUMENTS

| | | | | |
|---|---|---|---|---|
| 2016/0169514 | A1 | 6/2016 | Eastwood et al. | |
| 2019/0203606 | A1 | 7/2019 | Sarawate et al. | |
| 2020/0123919 | A1 * | 4/2020 | Hall | F01D 25/265 |

* cited by examiner

TURBINE NOZZLE ASSEMBLY

CROSS-REFERENCE TO RELATED APPLICATIONS

This application is a continuation application of and claims priority to U.S. patent application Ser. No. 17/562,130, filed Dec. 27, 2021, the disclosure of which is hereby incorporated herein by reference in its entirety.

BACKGROUND

The field of the present disclosure relates generally to turbine engines and, more specifically, to a turbine nozzle assembly used with a gas turbine engine.

Known turbine engines generally include a compressor for compressing air and a combustor for mixing compressed air and fuel prior to it being burned. Hot exhaust gases exiting the combustor are channeled through a turbine assembly that includes a stationary nozzle assembly including an annular array of nozzle segments that are contoured to direct the hot exhaust gases towards turbine blades spaced circumferentially about a rotor. The hot exhaust gases impact the turbine blades and cause rotation of the rotor, thereby producing mechanical work. Some known turbine engines include a turbine assembly having multiple stages of nozzle assemblies and turbine blades. The nozzle assembly and turbine blades of the first stage of the turbine assembly, i.e., at the inlet of the turbine assembly, are exposed to the highest temperatures of the hot exhaust gases exiting the combustor and, as a result, those assemblies and blades may be damaged more frequently than turbine blades in downstream stages of the turbine assembly. Repair or replacement of the first stage nozzle segments and/or turbine blades may therefore be necessary during the lifetime of the turbine engine.

In some known turbine engines, removal of the first stage nozzle segments can be accomplished without removing the outer shell of the turbine assembly. For example, nozzle segments may be removed through an opening defined at the inlet of the turbine assembly, when the combustor hardware is removed. However, in known turbine engines, access to the first stage turbine blades remains limited by nozzle segment supports located in the turbine assembly. As such, repair or replacement of the first stage turbine blades typically requires removal of at least a portion of the outer turbine shell, e.g., an upper half of the outer turbine shell. Removing the outer turbine shell is a time-consuming process that increases the down time of the turbine engine when one or more of the turbine blades is damaged.

Accordingly, it would be desirable to provide nozzle segment support elements that facilitate removal of the first stage turbine blades without the need to remove any portion of the outer turbine shell when repairing or replacing a first stage turbine blade. Advantages of such a system include at least reducing the turbine engine outage time and costs associated with repairing and replacing first stage turbine blades.

BRIEF DESCRIPTION

In one aspect, a turbine nozzle assembly for use in a turbine engine is provided. The assembly includes an inner barrel and a turbine nozzle support ring. The inner barrel has a forward end and an aft end. The turbine nozzle support ring includes an annular body that defines a forward end, an opposite aft end, an inner surface, and an opposite outer portion. The forward end of the annular body is coupled to the aft end of the inner barrel. The annular body includes a first arcuate segment and a second arcuate segment removably coupled to the first arcuate segment. The first arcuate segment has a first arcuate length and the second arcuate segment has a second arcuate length. The second arcuate length is shorter than the first arcuate length.

In another aspect, a turbine engine is provided. The turbine engine includes an outer casing, an inner barrel, a turbine nozzle support ring, and a plurality of nozzles. The inner barrel has a forward end and an aft end. The turbine nozzle support ring includes an annular body that defines a forward end, an opposite aft end, an inner surface, and an opposite outer portion. The forward end of the annular body is coupled to the aft end of the inner barrel. The annular body includes a first arcuate segment and a second arcuate segment removably coupled to the first arcuate segment. The first arcuate segment has a first arcuate length and the second arcuate segment has a second arcuate length. The second arcuate length is shorter than the first arcuate length. Each of the plurality of nozzles is removably coupled to the outer portion of the annular body.

In yet a further aspect, a method of assembling a turbine engine is provided. The method includes coupling a first arcuate segment to a second arcuate segment to form a turbine nozzle support ring. The first arcuate segment has a first arcuate length and the second arcuate segment has a second arcuate length. The second arcuate length is shorter than the first arcuate length. The method also includes coupling the support ring to an inner barrel within the turbine engine. The method further includes coupling a plurality of turbine nozzles to an outer portion of the support ring. The method also includes installing an outer casing that surrounds the plurality of turbine nozzles.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

Figure 1:
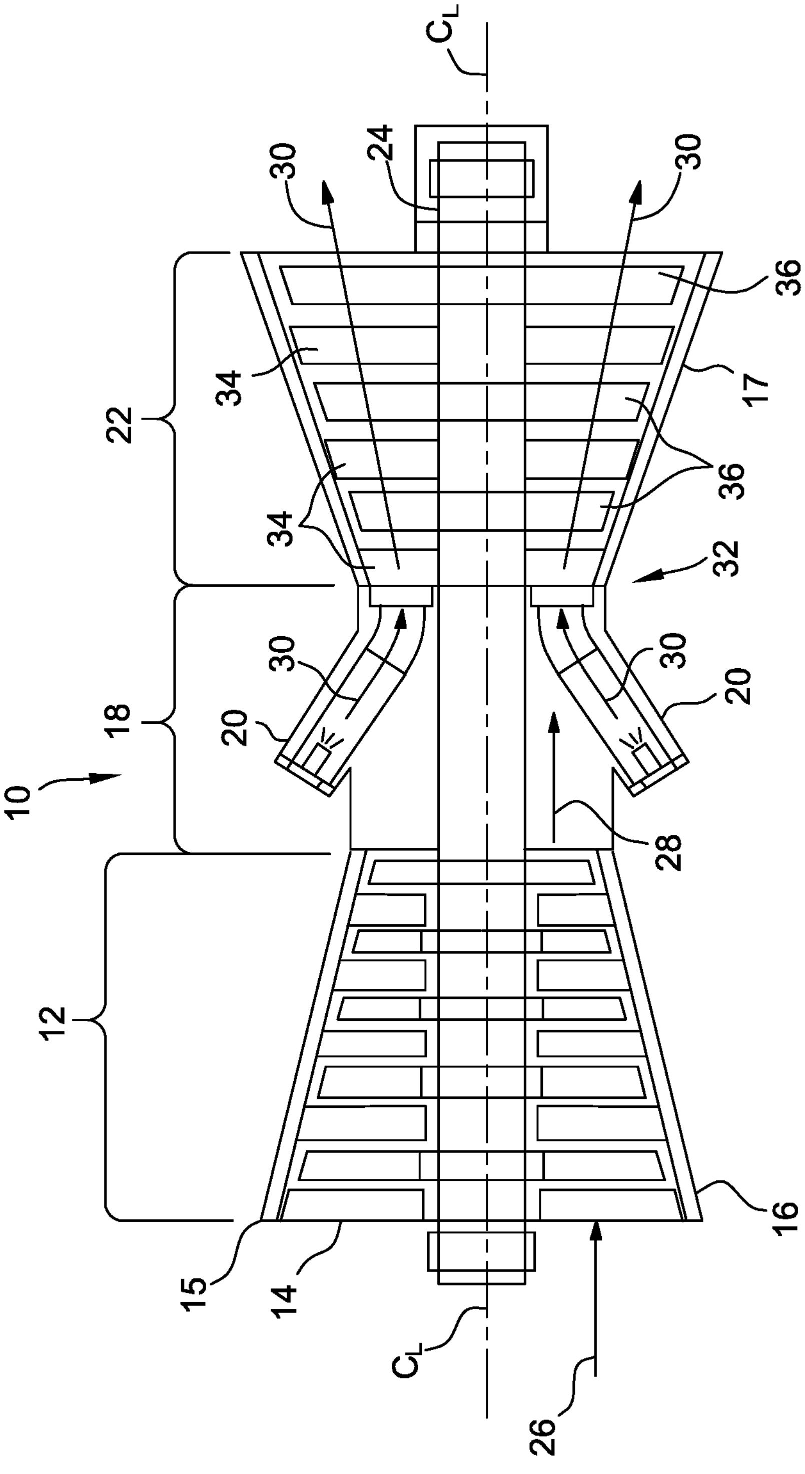
FIG. 1 Prior Art
FIG. 1 is a schematic of an exemplary known gas turbine engine.

FIG. 1 is a schematic of an exemplary gas turbine engine 10. As shown, the gas turbine 10 includes a compressor section 12 including an inlet 14 defined at an upstream end 15 of the gas turbine 10, and a casing 16 that at least partially circumscribes the compressor section 12. The gas turbine 10 also includes a combustion section 18 including a combustor 20 downstream from the compressor section 12, and a turbine section 22 downstream from the combustion section 18. A casing 17 at least partially circumscribes turbine section 22. A rotor shaft 24 extends axially through the gas turbine 10. As shown, the combustion section 18 may include a plurality of combustors 20.

In operation, air 26 is drawn into the inlet 14 of the compressor section 12 and is progressively compressed to provide compressed air 28 to the combustion section 18. The compressed air 28 flows into the combustion section 18 and is mixed with fuel in the combustor 20 to form a combustible mixture. The combustible mixture is burned in the combustor 20, thereby generating a hot gas 30 that flows from the combustor 20 into the turbine section 22 across a first stage 32 of turbine nozzles 34 and turbine blades 36. The hot gas rapidly expands as it flows through alternating stages of turbine blades 36 and turbine nozzles 34 coupled within the turbine section 22 along an axial centerline CL of the shaft 24. Thermal and/or kinetic energy is transferred from the hot gas to each stage of the turbine blades 36, thereby causing the shaft 24 to rotate and produce mechanical work. The shaft 24 may be coupled to a load such as a generator (not shown) so as to produce electricity. In addition or in the alternative, the shaft 24 may be used to drive the compressor section 12 of the gas turbine.

Figure 2:
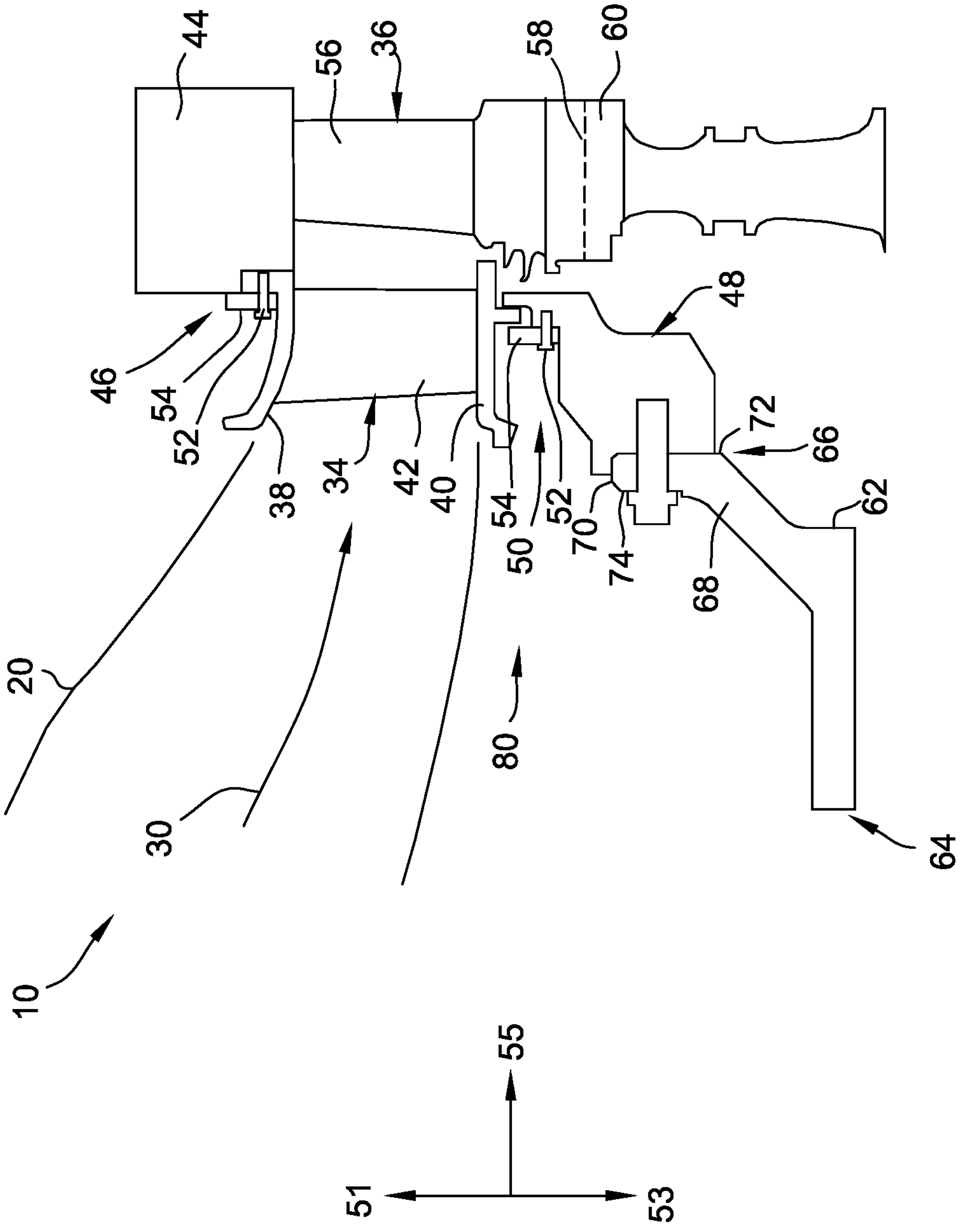
FIG. 2 is a partial cross-sectional side view of the gas turbine shown in FIG. 1.

FIG. 2 is a partial cross-sectional side view of gas turbine 10 shown in FIG. 1, including a portion of combustion section 18 and a portion of turbine section 22. As shown, combustor 20 channels hot gases 30 across the first stage 32 of nozzles 34 toward turbine blades 36. The nozzles 34 each have an outer band 38, an inner band 40, and a nozzle vane 42 that extends between the outer band 38 and inner band 40. The outer band 38 of each nozzle 34 is removably coupled to an outer support ring 44 via fastener assembly 46. The inner band 40 of each nozzle 34 is removably coupled to an inner support ring 48 by fastener assembly 50. In the exemplary embodiment, the fastener assemblies 46 and 50 each include a fastener 52 (e.g., a bolt) and a block 54. The block 54 of each fastener assembly 46 and 50 has a hole (not shown) defined therein sized to receive fastener 52. Each fastener 52 extends through a corresponding opening (not shown) formed in each respective support ring 44 and 48 to secure the block 54 thereto. The outer band 38 includes a member (not shown) that extends in a radially outward direction 51 and that is secured between the block 54 of fastener assembly 46 and outer support ring 44. The inner band 40 includes a member 41 (shown in FIG. 3) that extends in a radially inward direction 53 and that is secured between the block 54 of fastener assembly 50 and the inner support ring 48. Additionally, either outer band 38 and/or inner band 40 may have a mating element (not shown) (e.g., a machined hook) that is received within a corresponding mating slot (not shown) formed in the respective support ring 44 and 48, and/or block 54. The nozzles 34 may be accessed through an opening (not shown) formed in the gas turbine 10 when combustor hardware is removed. The nozzles 34 may then be removed by un-installing each fastener assembly 46 and 50.

The turbine blades 36 each include an airfoil 56 and a dovetail 58. The turbine blades 36 are each removably secured to corresponding rotor disk 60 via a slot 61 (shown in FIG. 9) that receives the dovetail 58 of the corresponding turbine blade 36. The disks 60 are spaced about a radial periphery of the shaft 24, such that each extends circumferentially about the shaft 24. The dovetail 58 of each turbine blade 36 is inserted axially (e.g., via a tangential entry, a straight axial entry, or a curved axial entry) into the slot 61 within each disk 60. In other embodiments, the dovetail 58 of each turbine blade 36 may be inserted in any suitable direction that enables the turbine blade 36 to function as described herein. The turbine blades 36 are each removed by sliding the dovetail 58 from the slot 61 of the corresponding disk 60.

Inner support ring 48 is coupled to inner barrel 62. Inner barrel 62 is in combustion section 18 and extends circumferentially about shaft 24. The inner barrel 62 extends in an axial direction 55 from a forward end 64 to an aft end 66. The aft end 66 of inner barrel 62 has a plate 68 that extends radially outward to a radial edge 70 extending between an aft axial surface 72 facing the turbine section 22, and a forward axial surface 74 facing the combustion section 18. In the exemplary embodiment, aft axial surface 72 and forward axial surface 74 are each substantially planar, and are substantially parallel to each other.

Figure 3:
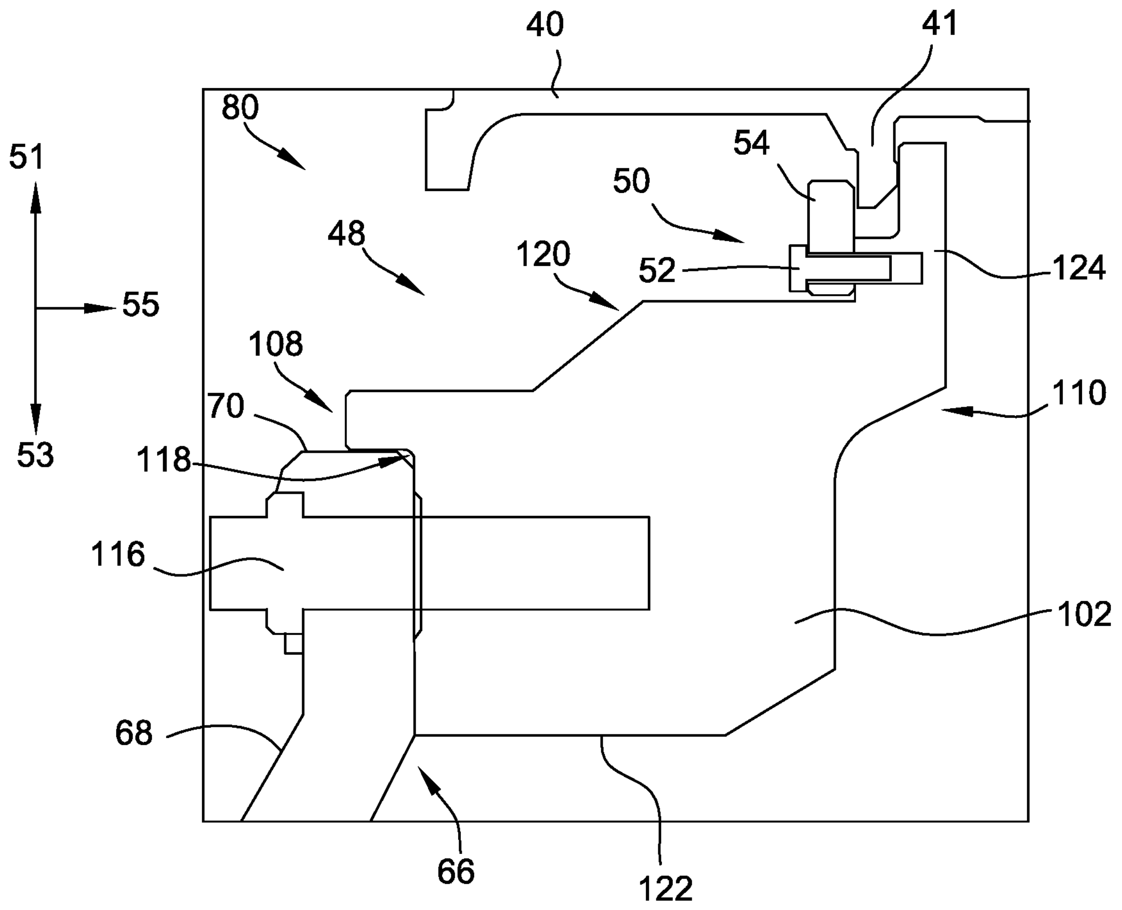
FIG. 3 is an enlarged cross-sectional side view of an exemplary inner support ring that may be installed in the gas turbine shown in FIGS. 1 and 2.
Figure 4:
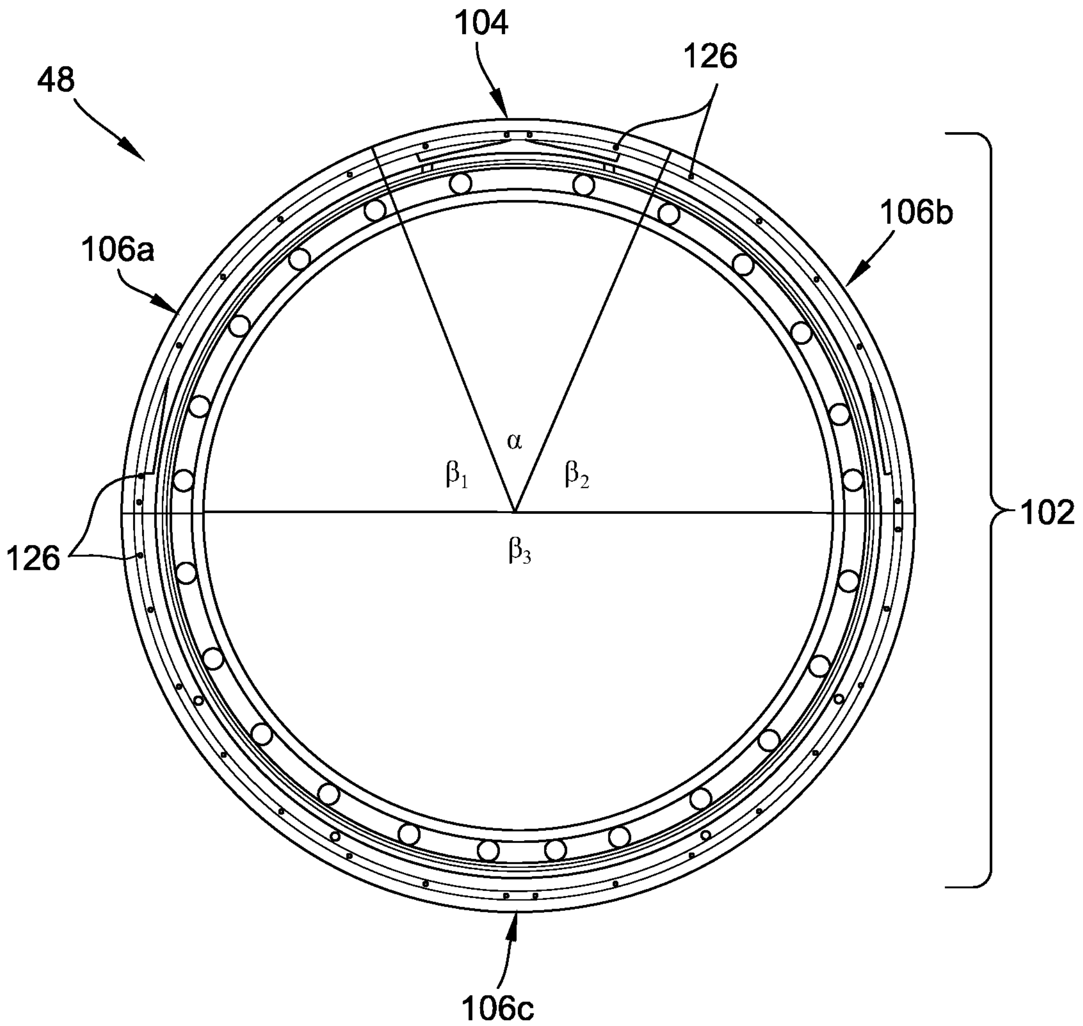
FIG. 4 is an isolated front view of the inner support ring shown in FIG. 3 and including a removable arcuate segment.
Figure 5:
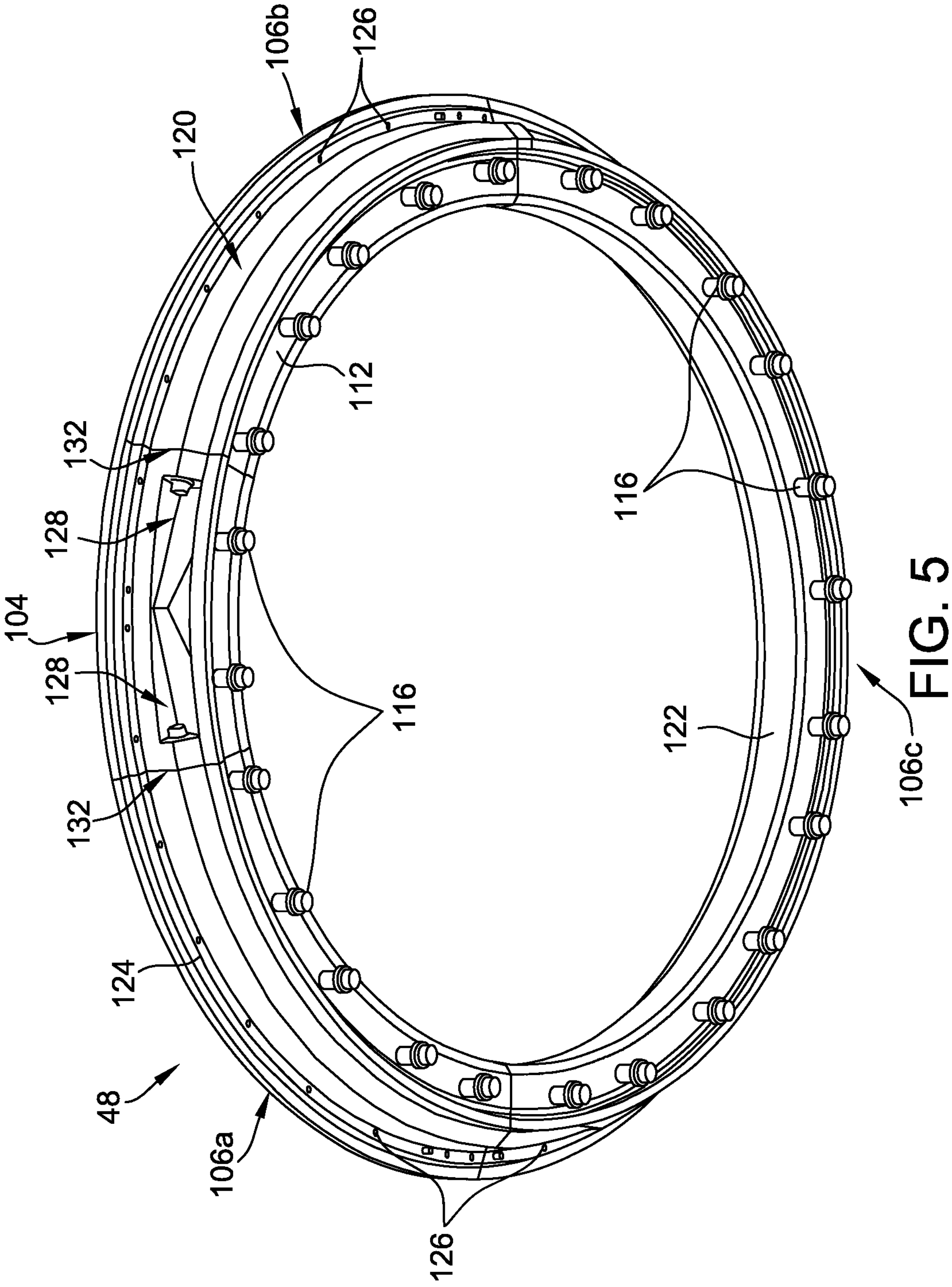
FIG. 5 is an isolated perspective top view of the inner support ring shown in FIG. 4.
Figure 6:
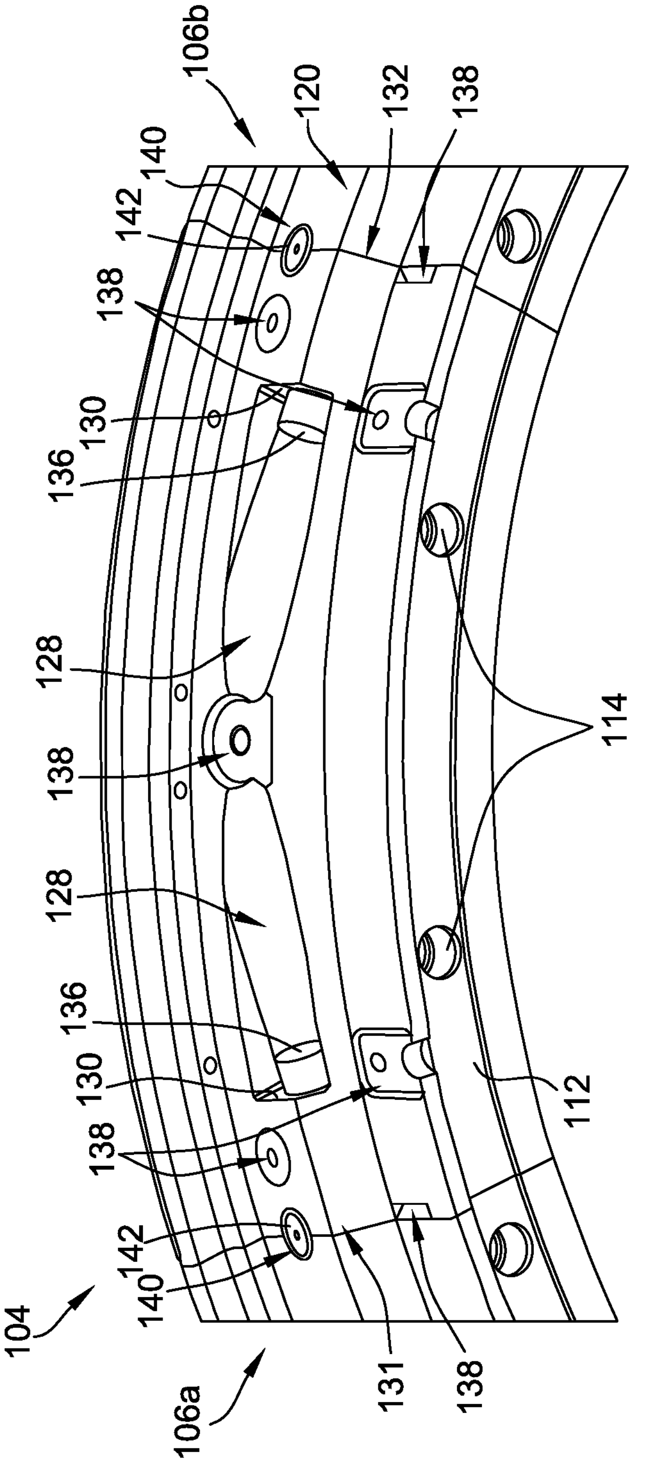
FIG. 6 is an enlarged perspective top view of the removable arcuate segment shown in FIGS. 4 and 5.

As shown in FIG. 2, access to the turbine blades 36 is restricted by a turbine nozzle assembly 80 that includes nozzles 34, inner support ring 48, and inner barrel 62. Access to the turbine blades 36 remains restricted because inner support ring 48 remains coupled to inner barrel 62 when nozzles 34 are removed from inner support ring 48. FIG. 3 is an enlarged cross-sectional side view of inner support ring 48 installed in gas turbine 10 as shown in FIG. 2. FIG. 4 is an isolated front view of inner support ring 48 including a removable arcuate segment 104. FIG. 5 is an isolated perspective top view of inner support ring 48 including the removable arcuate segment 104. FIG. 6 is an enlarged perspective top view of the removable arcuate segment 104 of inner support ring 48. As described in more detail herein, removal of the removable arcuate segment 104 from gas turbine 10 enables access to, and removal of, the turbine blades 36 without removing a portion of casing 17 of gas turbine 10 at turbine section 22.

Inner support ring 48 has an annular body 102 that includes the removable arcuate segment 104 and one or more fixed arcuate segments (e.g., fixed arcuate segments 106*a*-106*c*). As used herein, with respect to arcuate segments 104 and 106*a*-106*c* of the inner support ring 48, the term "removable" refers to an arcuate segment 104 that is removable from inner support ring 48 without removing a portion of casing 17 to facilitate access to turbine blades 36, and the term "fixed" refers to an arcuate segment (e.g., arcuate segments 106*a*-106*c*) that remains within the inner support ring 48 in gas turbine 10 when all removable arcuate segments have been removed. The removable arcuate segments (e.g., removable arcuate segment 104) may be removed, for example, through the opening or void (not shown) formed in combustion section 18 when combustor hardware is removed. The fixed arcuate segments (e.g., fixed arcuate segments 106*a-c*) may also be removed from gas turbine 10, for example, by first removing at least a portion of casing 17. In this regard, the removable arcuate segment 104 is suitably smaller than each of fixed arcuate segments 106*a*-106*c*. That is, the removable arcuate segment 104 extends an arcuate length α (shown in FIG. 4) that is shorter than each of an arcuate length $\beta_1$ of fixed arcuate segment 106*a*, an arcuate length $\beta_2$ of fixed arcuate segment 106*b*, and an arcuate length $\beta_3$ of fixed arcuate segment 106*c*. The arcuate length α of the removable arcuate segment 104 is suitably from about 30° to about 60°, from about 40° to about 50°, or about 45°. However, the arcuate length α of the removable arcuate segment 104 may be any value suitable to facilitate removal of the removable arcuate segment 104 as described herein. The total weight of removable arcuate segment 104 may be from about 200 to about 400 lbs. In some embodiments, the total weight of removable arcuate segment 104 may be from about 200 to about 250 lbs., from about 220 to about 240 lbs., or about 230 lbs. In other embodiments, the total weight of removable arcuate segment 104 may be from about 300 to about 350 lbs., from about 330 to about 345 lbs., or about 340 lbs. The removable arcuate segment 104 may be made of a steel suitable for high temperature application. For example, the removable arcuate segment 104 may be made of a steel material that includes a 400 series stainless steel material. The fixed arcuate segments 106*a*-106*c* may each be made of a similar steel material as removable arcuate segment 104, or may be made of a different material.

In the exemplary embodiment, the one or more fixed arcuate segments 106*a*-106*c* include a first fixed arcuate segment 106*a*, a second fixed arcuate segment 106*b*, and a third fixed arcuate segment 106*c*. The first and second fixed arcuate segments 106*a* and 106*b* form, together with the removable arcuate segment 104, approximately half of the annular body 102 of inner support ring 48, and the third fixed arcuate segment 106*c* forms the other half of the annular body 102 of inner support ring 48. In the exemplary embodiment, the removable arcuate segment 104 and the fixed arcuate segments 106*a* and 106*b* form an upper half portion of inner support ring 48, relative to gas turbine 10 when inner support ring 48 is installed, and the fixed arcuate segment 106*c* forms a lower half portion. In another embodiment, a unitary fixed arcuate segment (not shown) may be used to completely form, together with the removable arcuate segment 104, the inner support ring 48. In alternative embodiments, any number of removable arcuate segments 104 and/or fixed arcuate segments 106*a-c* may form the annular body 102 that enables inner support ring 48 to function as described herein.

The annular body 102 formed by the removable arcuate segment 104 and the one or more fixed arcuate segments 106*a*-106*c* defines a forward end 108 and an aft end 110. As shown in FIGS. 2 and 3, when inner support ring 48 is installed in gas turbine 10, forward end 108 is coupled to the aft axial surface 72 of plate 68 of inner barrel 62. Inner support ring 48 is removably coupled to inner barrel 62 at least at the removable arcuate segment 104 of annular body 102. For example, in the exemplary embodiment, inner barrel 62 has bores 63 (shown in FIGS. 8 and 9) formed proximate the radial edge 70 of plate 68 and extending from the forward axial surface 74 through the aft axial surface 72. The forward end 108 of annular body 102 defines a substantially planar surface 112 that extends continuously about the annular body 102 of the inner support ring 48. In the exemplary embodiment, a plurality of apertures 114 (shown in FIG. 6) are formed in the surface 112 of forward end 108 at the removable arcuate segment 104. The apertures 114 correspond to and are substantially concentrically aligned with bores 63 formed in inner barrel 62. Fasteners 116 (e.g., bolts) extend through the bores 63 and the corresponding apertures 114 to removably couple the removable arcuate segment 104 of annular body 102 to plate 68. In the exemplary embodiment, each fixed arcuate segment of annular body 102 are each also removably coupled to plate 68. That is, apertures 114 are disposed circumferentially about the forward end 108 of annular body 102. The bores 63 are correspondingly disposed circumferentially about plate 68 proximate radial edge 70. The fasteners 116 extend through the bores 63 and corresponding apertures 114 to removably couple each of the removable arcuate segment 104 and the fixed arcuate segments 106*a*-106*c* of annular body 102 to plate 68. However, the fixed arcuate segments 106*a*-106*c* of annular body 102 need not be removably coupled to plate 68 as described herein. In alternative embodiments, the removable arcuate segment 104 and/or each fixed arcuate segment 106*a*-106*c* of annular body 102 may be removably coupled to plate 68 using any other means known in the art.

As shown in FIG. 3, an L-shaped rabbet 118 is formed in the surface 112 of forward end 108. Rabbet 118 is sized and oriented to receive the aft axial surface 72 and the radial edge 70 of plate 68 and facilitates radial alignment of the bores 63 formed in plate 68 and corresponding apertures 114 formed in surface 112 of forward end 108 of annular body 102. In the exemplary embodiment, rabbet 118 extends circumferentially about the annular body 102. In other embodiments, rabbet 118 extends about the forward end 108 only at the removable arcuate segment 104, and does not extend circumferentially about the entire annular body 102. In still other embodiments, forward end 108 of annular body 102 does not include rabbet 118.

Referring to FIGS. 3-6, annular body 102 also includes a radially outer portion 120 and a radially inner surface 122. The outer portion 120 extends axially between the forward end 108 and the aft end 110 of the annular body 102 and has a nozzle mount 124 proximate the aft end 110. The nozzle mount 124 extends radially outward and defines the outermost circumference of annular body 102. Openings 126 (shown in FIGS. 4 and 5) are formed in the nozzle mount 124 and are spaced circumferentially about annular body 102. As described above, each inner band 40 includes a member 41 extending radially inward. Moreover, each member 41 extends between the block 54 and nozzle mount 124. The fastener 52 extends axially through block 54 of each fastener assembly 50 for each inner band 40 and into a corresponding opening 126 to removably couple each corresponding nozzle 34 to the inner support ring 48.

As shown in FIGS. 5 and 6, the annular body 102 is formed with a recess 128 in the outer portion 120 at the removable arcuate segment 104. The recess 128 is defined by sidewalls 130 extending near the circumferential ends 131 of removable arcuate segment 104. The removable arcuate segment 104 has circumferential end flanges (e.g., end flange 200 shown in FIG. 7) that each mate with a circumferential edge 202 (shown in FIG. 8) of the adjacent fixed arcuate segment 106*a* and 106*b* to form joint interfaces 132. In the exemplary embodiment, one of the circumferential end flanges 200 mates with a circumferential edge 202 of the adjacent fixed arcuate segment 106*a* to form one of the joint interfaces 132, and the other circumferential end flange 200 mates with a circumferential edge 202 of the adjacent fixed arcuate segment 106*b* to form the other joint interface 132. It should be readily apparent that, in the exemplary embodiment, the other one of the circumferential edges 202 of each of the fixed arcuate segments 106*a* and 106*b* mates with an adjacent circumferential edge 202 of the fixed arcuate segment 106*c*. In embodiments where a unitary fixed arcuate segment (not shown) is used with a removable arcuate segment 104 to form the annular body 102, each of the circumferential end flanges 200 of the removable arcuate segment 104 mates with an adjacent circumferential edge 202 of the unitary fixed arcuate segment to form joint interfaces 132.

The removable arcuate segment 104 is removably coupled to each adjacent fixed arcuate segment (e.g., fixed arcuate segments 106*a* and 106*b*) along the joint interfaces 132. In the exemplary embodiment, holes 134 (shown in FIG. 7) are defined in the sidewalls 130 of recess 128 formed on the outer portion 120 at the removable arcuate segment 104. When the joint interfaces 132 are formed, the holes 134 extend from the sidewalls 130 through the joint interface 132 into the adjacent fixed arcuate segment 106*a* and 106*b*. That is, the circumferential edges 202 of the adjacent segments 106*a* and 106*b* have holes (not shown) formed therein that align with the holes 134 formed in the sidewalls 130 when the joint interfaces 132 are formed. Fasteners 136 (e.g., bolts) are received in the holes 134 at the sidewalls 130 and extend through the joint interfaces 132 to couple the removable arcuate segment 104 to the adjacent fixed arcuate segments 106*a* and 106*b*. The fasteners 136 are removed to thereby enable the removable arcuate segment 104 to be removed from inner support ring 48.

Figure 7:
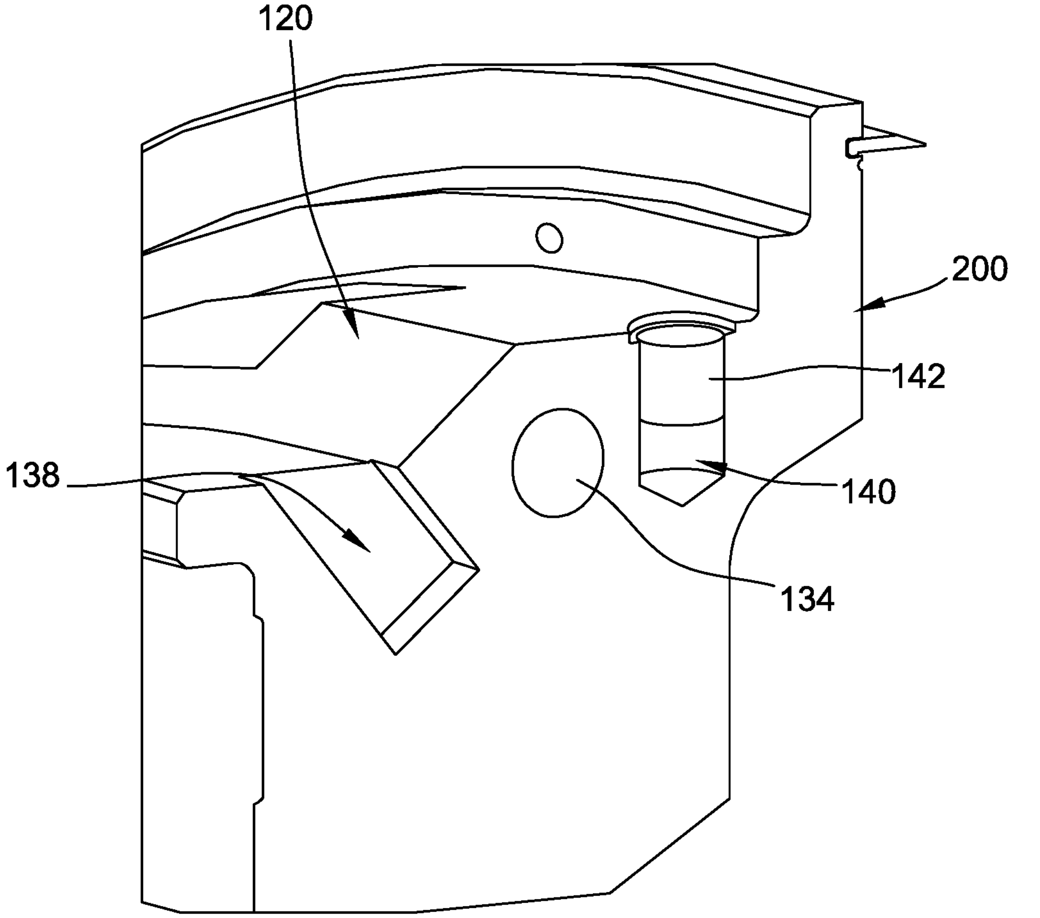
FIG. 7 is an isolated side view of the removable arcuate segment shown in FIG. 6 and including exemplary circumferential end flanges.

As shown in FIGS. 6 and 7, various lifting slots 138 may be defined in the outer portion 120 at the removable arcuate segment 104 to facilitate removal of the removable arcuate segment 104. Each lifting slot 138 may be sized and shaped to receive a lifting tool (not shown). The lifting tool may facilitate removal of the removable arcuate segment 104 from the inner support ring 48 and/or facilitate removal of the removable arcuate segment 104 from the gas turbine 10. The removable arcuate segment 104 may be located on an upper half portion of inner support ring 48, relative to the gas turbine 10. For example, the removable arcuate segment 104 may be located at a top center portion of inner support ring 48 along the uppermost portion of inner support ring 48. In other embodiments, the removable arcuate segment 104 may be located on a bottom half portion of inner support ring 48, such as at a bottom center portion of inner support ring 48 along the bottommost portion of inner support ring 48, relative to the gas turbine 10.

FIG. 7 is an isolated side view of the removable arcuate segment 104 including exemplary circumferential end flanges 200. Each end flange 200 includes hole 134 extending therethrough from a sidewall 130 formed by recess 128 (shown in FIGS. 5 and 6). Each end flange 200 also includes a lifting slot 138 that is sized and shaped to receive an appropriate lifting tool (e.g., a crowbar). Each end flange 200 also includes an alignment slot 140 formed in the outer portion 120. As shown in FIG. 6, the circumferential end of each adjacent fixed arcuate segment 106*a* and 106*b* includes a corresponding slot so that alignment slots 140 are defined at the joint interfaces 132. The alignment slots 140 receive radial dowels 142 to axially align the removable arcuate segment 104 and the adjacent fixed arcuate segments 106*a* and 106*b*. In other embodiments, the circumferential end flange 200 may not include the lifting slot 138 and/or the alignment slot 140 formed thereon.

Figure 8:
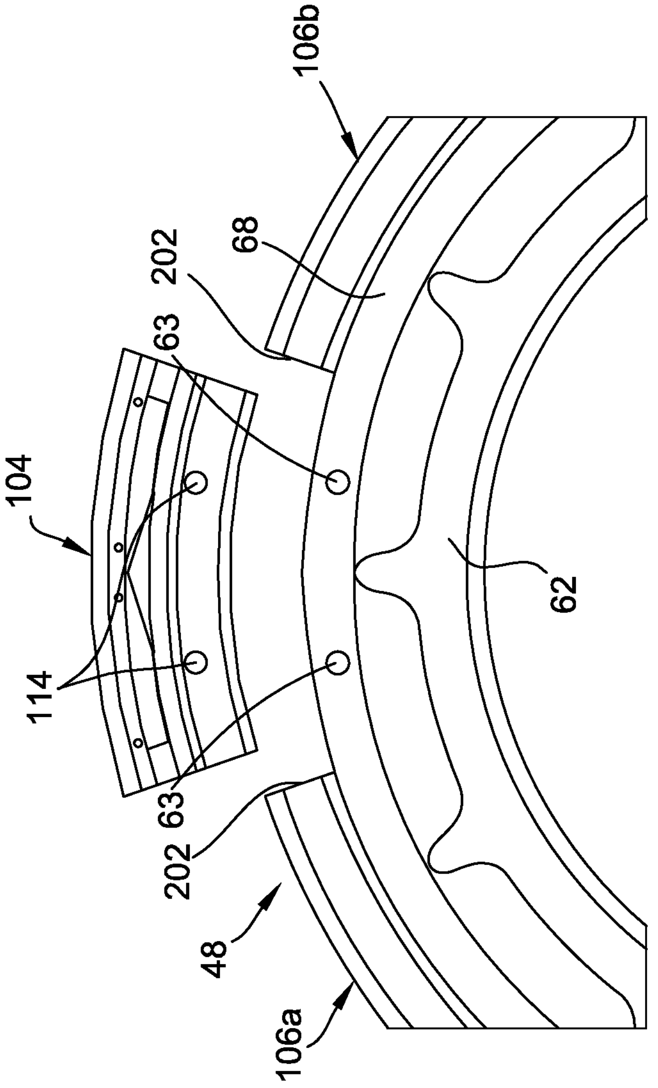
FIG. 8 is a partial schematic view of inner support ring coupled to barrel and viewed along axial centerline CL shown in FIG. 1.
Figure 9:
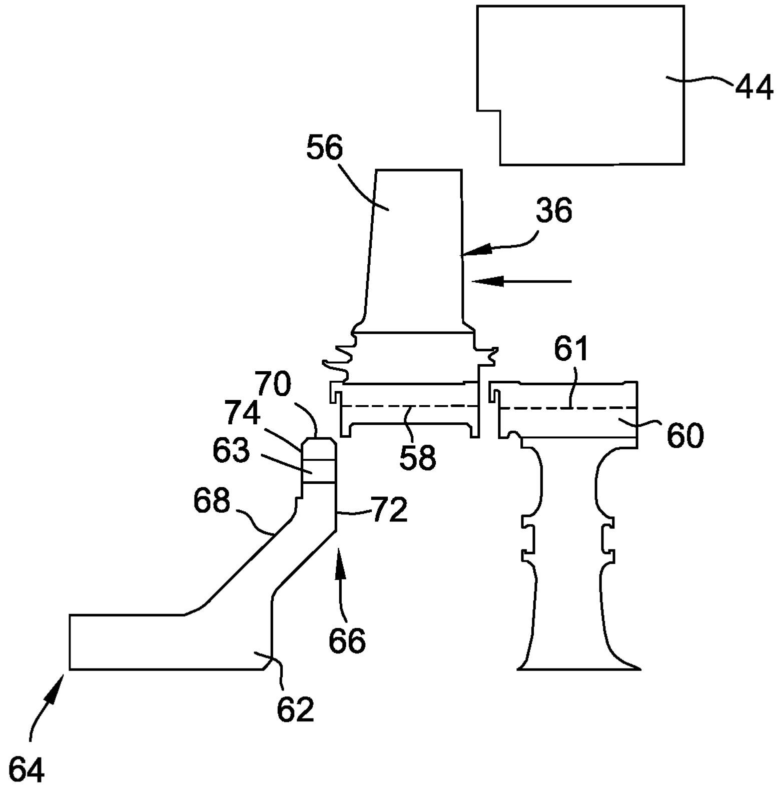
FIG. 9 is a partial cross-sectional side view of the gas turbine shown in FIG. 2, with at least one of the turbine nozzles and the removable arcuate segments of the inner support ring removed.

FIG. 8 is a partial schematic view of inner support ring 48 coupled to barrel 62 and viewed along axial centerline $C_L$ (shown in FIG. 1) from the forward end 64 of barrel 62 (shown in FIG. 2). As shown therein, fasteners 116 have been removed from the apertures 114 formed in the forward end 108 (and from the corresponding bores 63 formed in the barrel plate 68). A lifting tool (not shown) is used to lift the removable arcuate segment 104 from the inner support ring 48. FIG. 9 is a partial cross-sectional side view of gas turbine 10 as shown in FIG. 2, with at least one of the nozzles 34 and the removable arcuate segment 104 of inner support ring 48 removed from gas turbine 10. As shown in FIG. 9, removal of the removable arcuate segment 104 enables access to turbine blades 36 without removing casing 17 of turbine section 22. A damaged turbine blade 36 can thereby be removed by sliding the dovetail 58 out of the slot 61 of the corresponding disk 60.

Figure 10:
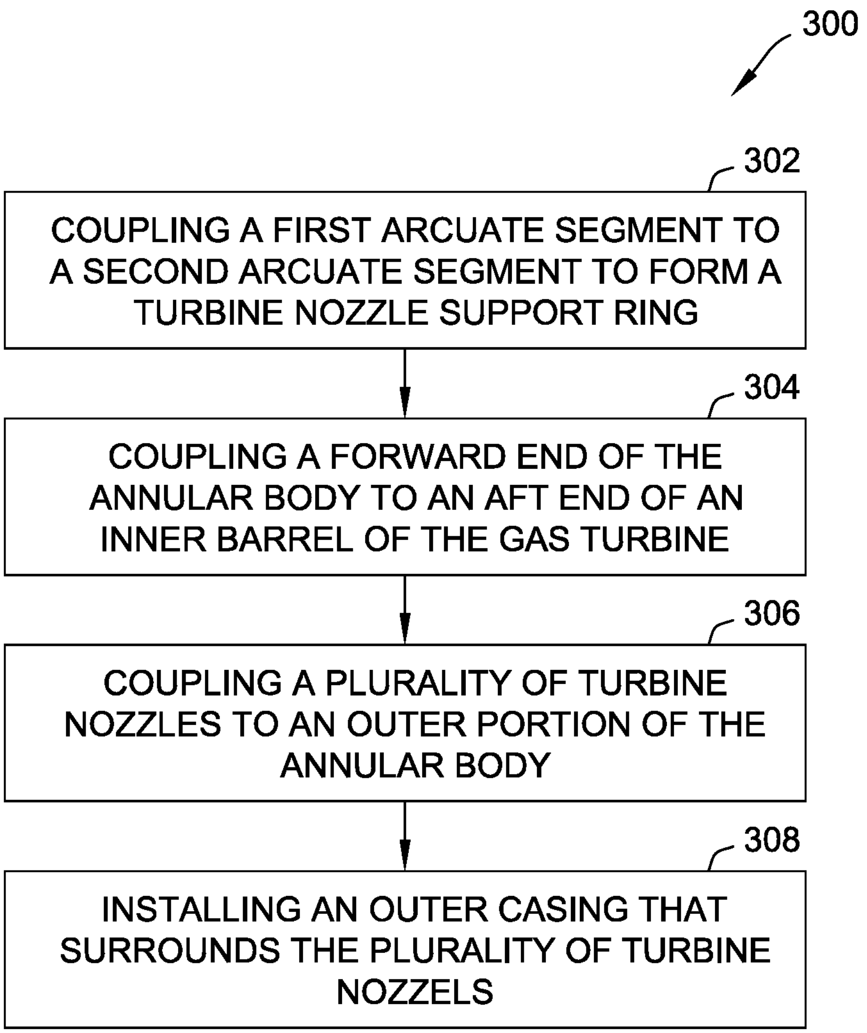
FIG. 10 is a process flow of an exemplary method of assembling a turbine nozzle assembly in a gas turbine engine.

FIG. 10 is a process flow 300 of an exemplary method of assembling a turbine engine 10. The method includes, at 302, coupling a first arcuate segment 106*a* or 106*b* to a second arcuate segment 104 to form an annular body 102 of a turbine nozzle inner support ring 48. The coupling at 302 may be facilitated by mating circumferential end flanges 200 of the second arcuate segment 104 with adjacent circumferential edges 202 of the first arcuate segment 106*a* or 106*b* to form at least one joint interface 132 and extending fasteners 136 through the at least one joint interface 132. The second arcuate segment 104 has an arcuate length α that is shorter than an arcuate length $\beta_1$ or $\beta_2$ of the first arcuate segment 106*a* or 106*b*. The arcuate length α of the second arcuate segment 104 is suitably from about 30° to about 60°, from about 40° to about 50°, or about 45°. The method also includes, at 304, coupling a forward end 108 of the annular body 102 to an aft end 66 of an inner barrel 62 of the gas turbine 10. The coupling at 304 may be facilitated by extending fasteners 116 through bores 63 formed in a radially extending plate 68 at the aft end 66 of the inner barrel 62 and extending the fasteners 116 through corresponding apertures 114 formed in the forward end 108 of the annular body 102. The method further includes, at 306, coupling a plurality of turbine nozzles 34 to an outer portion 120 of the annular body 102. At step 308, an outer casing 17 is installed. The casing 17 surrounds the plurality of turbine nozzles 34. In accordance with the present disclosure, each of the turbine nozzles 34 and the removable arcuate segment 104 can be removed from the turbine engine 10 without removing the outer casing 17.

The systems and methods described herein facilitate in-situ removal of turbine blades located in a turbine section of a gas turbine engine without removing a casing surrounding the turbine section. Specifically, the systems and methods provide a turbine nozzle assembly wherein an inner support ring is coupled to an inner barrel of the gas turbine and a plurality of nozzles in the turbine section. Each of the plurality of nozzles is removably coupled to the inner support ring, such that any of such may be removed through an opening formed in a combustion section of gas turbine. The inner support ring has a removable arcuate segment that is removed through the opening formed in the combustion section. The removal of the nozzles and removable arcuate segment provides access to damaged turbine blades within the turbine section, which can likewise be removed through the opening formed in the combustion section. Therefore, in contrast to known gas turbine engines, the systems and methods described herein facilitate repair and/or replacement of turbine blades without removing a casing surrounding the turbine section. As such, the systems and methods described herein enable the damaged turbine blades to be removed via a less time-consuming process, thereby decreasing the down time of the turbine engine and associated maintenance costs when one or more of the turbine blades is damaged.

An exemplary technical effect of the methods and systems described herein includes at least one of: (a) in-situ repair and replacement of a damaged turbine blade; (b) reducing the gas turbine engine outage time and costs associated with repairing and replacing turbine blades; (c) improving safety conditions of the repair and replacement process for turbine blades by reducing the number of hardware components needed to be removed during the process.

Further aspects of the present disclosure are provided by the subject matter of the following clauses:

1. A turbine nozzle assembly for use in a turbine engine, the assembly comprising: an inner barrel comprising a forward end and an aft end; and a turbine nozzle support ring comprising an annular body defining a forward end, an opposite aft end, an inner surface, and an opposite outer portion, the forward end of the annular body coupled to the aft end of the inner barrel, the annular body comprising: a first arcuate segment having a first arcuate length; and a second arcuate segment removably coupled to the first arcuate segment, the second arcuate segment having a second arcuate length; wherein the second arcuate length is shorter than the first arcuate length.

2. The turbine nozzle assembly according to any preceding clause, further comprising a plurality of turbine nozzles removably coupled to the outer portion of the support ring.

3. The turbine nozzle assembly according to any preceding clause, wherein the second arcuate segment comprises at least one circumferential end flange, and the first arcuate segment comprises at least one circumferential edge adjacent the at least one circumferential end flange, wherein the at least one circumferential end flange mates with the at least one adjacent circumferential edge to form at least one joint interface.

4. The turbine nozzle assembly according to any preceding clause, wherein the second arcuate segment is releasably coupled to the first arcuate segment by at least one fastener extending through the at least one joint interface.

5. The turbine nozzle assembly according to any preceding clause, wherein the annular body comprises an alignment slot formed in the outer portion at the at least one joint interface, wherein the alignment slot receives a dowel to axially align the first arcuate segment and the second arcuate segment.

6. The turbine nozzle assembly according to any preceding clause, wherein the annular body further comprises a third arcuate segment removably coupled to the second arcuate segment, the third arcuate segment having a third arcuate length, the second arcuate length being shorter than the third arcuate length.

7. The turbine nozzle assembly according to any preceding clause, wherein the annular body has at least one lifting slot formed in the outer portion at the second arcuate segment, wherein the at least one lifting slot receives a tool for removing the second arcuate segment from the support ring.

8. The turbine nozzle assembly according to any preceding clause, wherein the second arcuate length is from about 30° to about 60°.

9. The turbine nozzle assembly according to any preceding clause, wherein the second arcuate length is about 45°.

10. The turbine nozzle assembly according to any preceding clause, wherein the inner barrel comprises a radially extending plate at the aft end, the plate comprising a forward-facing surface and an aft-facing surface, wherein the forward end of the annular body is coupled to the aft-facing surface of the plate.

11. The turbine nozzle assembly according to any preceding clause, wherein the plate comprises bores extending axially from the forward-facing surface through the aft-facing surface, wherein the annular body comprises apertures formed in the forward end corresponding to the bores, and wherein the bores and corresponding apertures receive fasteners to removably couple the annular body to the plate.

12. The turbine nozzle assembly according to any preceding clause, wherein the plate comprises a radial edge extending between the forward-facing surface and the aft-facing surface, and wherein a rabbet is formed at the forward end of the annular body that receives the radial edge when the annular body is coupled to the inner barrel.

13. A turbine engine comprising: an outer casing; an inner barrel comprising a forward end and an aft end; a turbine nozzle support ring comprising an annular body defining a forward end, an opposite aft end, an inner surface, and an opposite outer portion, the forward end of the annular body coupled to the aft end of the inner barrel, the annular body comprising: a first arcuate segment having a first arcuate length; and a second arcuate segment removably coupled to the first arcuate segment, the second arcuate segment having a second arcuate length; wherein the second arcuate length is shorter than the first arcuate length; and a plurality of nozzles removably coupled to the outer portion of the annular body.

14. The turbine engine according to any preceding clause, wherein the second arcuate segment has a weight of about 200 lbs. to about 400 lbs.

15. The turbine engine according to any preceding clause, wherein the second arcuate length is from about 30° to about 60°.

16. The turbine engine according to any preceding clause, wherein the second arcuate length is about 45°.

17. The turbine engine according to any preceding clause, wherein the second arcuate segment is formed of a steel material comprising 400 series stainless steel.

18. A method of assembling a turbine engine, the method comprising: coupling a first arcuate segment having a first arcuate length to a second arcuate segment having a second arcuate length to form a turbine nozzle support ring, wherein the second arcuate length is shorter than the first arcuate length; coupling the support ring to an inner barrel within the turbine engine; coupling a plurality of turbine nozzles to an outer portion of the support ring; and installing an outer casing that surrounds the plurality of turbine nozzles.

19. The method according to any preceding clause, wherein the plurality of nozzles and the second arcuate segment can each be removed from the turbine engine without removing the outer casing.

20. The method according to any preceding clause, wherein the coupling the first arcuate segment to the second arcuate segment comprises mating at least one circumferential flange of the second arcuate segment with at least one adjacent circumferential edge of the first arcuate segment to form at least one joint interface and extending at least one fastener through the at least one joint interface.

The methods and systems described herein are not limited to the specific embodiments described herein. For example, components of each system and/or steps of each method may be utilized independently and separately from other components and/or steps described herein. For example, the method and systems may also be used in combination with other turbine systems, and are not limited to practice only with the gas turbine engines as described herein. Rather, the exemplary embodiment can be implemented and utilized in connection with many other turbine applications.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the systems and methods described herein, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A nozzle assembly for use in a turbine engine, the nozzle assembly comprising:

- an inner barrel comprising a barrel forward end and a barrel aft end; and
- a nozzle support ring defining a nozzle support ring forward end, an opposite nozzle support ring aft end, an inner surface, and an opposite outer portion, the nozzle support ring forward end coupled to the barrel aft end via fasteners extending at least partially through the barrel aft end and the nozzle support ring forward end, the nozzle support ring comprising:
  - a first arcuate segment; and
  - a second arcuate segment having an arc length smaller than an arc length of the first arcuate segment, wherein the second arcuate segment is mechanically and removably coupled to the first arcuate segment at an interface defined between adjacent ends of the first and second arcuate segments to form the nozzle support ring and is mechanically and removably coupled to the inner barrel via the fasteners extending at least partially through the barrel aft end and the nozzle support ring forward end, such that the second arcuate segment is removable from the inner barrel without removing the first arcuate segment.

2. The nozzle assembly of claim 1, further comprising a plurality of turbine nozzles removably coupled to the outer portion of the nozzle support ring.

3. The nozzle assembly of claim 1, wherein the second arcuate segment is removably coupled to the first arcuate segment by at least one fastener extending at least partially through an interface defined between the first and second adjacent arcuate segments.

4. The nozzle assembly of claim 1, wherein an alignment slot is formed in an interface defined between the first and second arcuate segments, where the alignment slot extends radially inward from the outer portion at the interface and the alignment slot is sized to receive a dowel at least partially therethrough to substantially align the first arcuate segment with the second arcuate segment.

5. The nozzle assembly of claim 1, wherein the nozzle support ring further comprises a third arcuate segment, and wherein the second arcuate segment is mechanically and removably coupled to the third arcuate segment at an interface defined between adjacent ends of the second and third arcuate segments to form the nozzle support ring.

6. The nozzle assembly of claim 5, wherein the arc length of the second arcuate segment is smaller than an arc length of the third arcuate segment.

7. The nozzle assembly of claim 5, wherein the second arcuate segment is mechanically removably coupled to the first arcuate segment via at least one fastener extending at least partially through an interface defined between the first and second arcuate segments, and the second arcuate segment is mechanically and removably coupled to the third arcuate segment via at least one fastener extending at least partially through an interface defined between the second and third arcuate segments.

8. The nozzle assembly of claim 5, wherein an alignment slot is formed in the interface defined between the first and second arcuate segments and in an interface defined between the second and third arcuate segments, wherein each alignment slot extends radially inward from the outer portion at each respective interface and each alignment slot is sized to receive a dowel at least partially therethrough to substantially align the adjacent arcuate segments.

9. The nozzle assembly of claim 1, wherein the nozzle support ring has at least one lifting slot formed in the outer portion at the second arcuate segment, wherein the at least one lifting slot is sized and oriented to receive a tool for use in removing the second arcuate segment from the first arcuate segment.

10. The nozzle assembly of claim 1, wherein the nozzle support ring is coupled to the inner barrel via the fasteners extending at least partially through the barrel aft end and the nozzle support ring forward end at the first arcuate segment and at the second arcuate segment.

11. The nozzle assembly of claim 1, wherein the barrel aft end comprises a radial edge, and wherein a rabbet formed at the nozzle support ring forward end receives the radial edge when the nozzle support ring is coupled to the inner barrel.

12. A turbine engine comprising:

- an inner barrel comprising a barrel forward end and a barrel aft end;
- a nozzle support ring defining a nozzle support ring forward end, an opposite nozzle support ring aft end, an inner surface, and an opposite outer portion, the nozzle support ring forward end coupled to the barrel aft end via fasteners extending at least partially through the barrel aft end and the nozzle support ring forward end, the nozzle support ring comprising:
  - a first arcuate segment; and
  - a second arcuate segment having an arc length smaller than an arc length of the first arcuate segment, wherein the second arcuate segment is mechanically and removably coupled to the first arcuate segment at an interface defined between adjacent ends of the first and second arcuate segments to form the nozzle support ring and is mechanically and removably coupled to the inner barrel via the fasteners extending at least partially through the barrel aft end and the nozzle support ring forward end;
- a plurality of nozzles removably coupled to the outer portion of the nozzle support ring; and
- an outer casing surrounding the plurality of nozzles;
- wherein the second arcuate segment is removable from the inner barrel and the first arcuate segment without removing the outer casing.

13. The turbine engine of claim 12, wherein the second arcuate segment has a weight of about 200 lbs. to about 400 lbs.

14. The turbine engine of claim 12, wherein the second arcuate segment has an arc length between about 30° to about 60°.

15. The turbine engine of claim 14, wherein the arc length of the second arcuate segment is about 45°.

16. The turbine engine of claim 12, wherein the second arcuate segment is formed of a steel material comprising stainless steel.

17. A method of assembling a turbine engine, the method comprising:

mechanically coupling a first arcuate segment to a second arcuate segment at an interface defined between adjacent ends of the first and second arcuate segments to form a nozzle support ring, the second arcuate segment having an arc length smaller than an arc length of the first arcuate segment, wherein the second arcuate segment is removably coupled to the first arcuate segment at the interface;

mechanically coupling the nozzle support ring to an inner barrel within the turbine engine by extending fasteners at least partially through an aft end of the inner barrel and a forward end of the nozzle support ring at the second arcuate segment such that the second arcuate segment is removably coupled to the inner barrel;

coupling a plurality of turbine nozzles to an outer portion of the nozzle support ring; and installing an outer casing that surrounds the plurality of turbine nozzles, wherein the second arcuate segment is removable from the inner barrel without removing the outer casing or the first arcuate segment.

18. The method of claim 17, wherein mechanically coupling the first arcuate segment to the second arcuate segment comprises extending at least one fastener at least partially through an interface defined between the first and second arcuate segments.

19. The method of claim 17, wherein mechanically coupling the nozzle support ring to the inner barrel comprises extending the fasteners at least partially through the aft end of the inner barrel and the forward end of the nozzle support ring at the second arcuate segment and at the first arcuate segment.

* * * * *